(12) United States Patent
Chen et al.

(10) Patent No.: US 12,001,518 B2
(45) Date of Patent: Jun. 4, 2024

(54) METHOD FOR PREDICTING MATCHING DEGREE BETWEEN RESUME AND POST, AND RELATED DEVICE

(71) Applicant: National University of Defense Technology, Hunan (CN)

(72) Inventors: Honghui Chen, Hunan (CN); Taihua Shao, Hunan (CN); Chengyu Song, Hunan (CN); Miao Jiang, Hunan (CN); Mengru Wang, Hunan (CN); Xin Zhang, Hunan (CN); Fei Cai, Hunan (CN); Dengfeng Liu, Hunan (CN); Siyuan Wang, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/083,211

(22) Filed: Dec. 16, 2022

(65) Prior Publication Data

US 2023/0195850 A1    Jun. 22, 2023

(30) Foreign Application Priority Data

Dec. 17, 2021 (CN) .......................... 202111548891.0

(51) Int. Cl.
*G06F 17/16* (2006.01)
*G06F 18/241* (2023.01)
*G06N 5/01* (2023.01)
*G06Q 10/1053* (2023.01)

(52) U.S. Cl.
CPC ............ *G06F 18/241* (2023.01); *G06F 17/16* (2013.01); *G06N 5/01* (2023.01); *G06Q 10/1053* (2013.01)

(58) Field of Classification Search
None
See application file for complete search history.

(56) References Cited

U.S. PATENT DOCUMENTS

| 6,728,695 | B1 * | 4/2004 | Pathria | G06F 40/216 |
| | | | | 707/E17.084 |
| 11,062,267 | B1 * | 7/2021 | Toomey | G06Q 30/02 |
| 2019/0108217 | A1 * | 4/2019 | Chen | G06F 40/289 |
| 2019/0220824 | A1 * | 7/2019 | Liu | G06Q 10/063112 |
| 2019/0317966 | A1 * | 10/2019 | Qin | G06F 40/30 |
| 2021/0090694 | A1 * | 3/2021 | Colley | G16H 15/00 |
| 2023/0046851 | A1 * | 2/2023 | Ogura | G06F 40/289 |

* cited by examiner

*Primary Examiner* — Yu Zhao

(57) ABSTRACT

A method for predicting matching degree between a resume and a post, and a related device are provided in this disclosure. In the method for predicting the matching degree between the resume and the post, and the related device according to this disclosure, firstly the semi-structured keys and values in post information and resume information and their source are obtained. Then, the matching degree between the resume information and the post information is predicted by a prediction model including a cascaded pre-trained language model, a Transformer encoder and a single label classification model, based on the keys and values of a respective post information and resume information attribute, and corresponding source representations. Thus, by comprehensively searching internal interaction and external interaction of semi-structured multivariate attributes in person-post matching, the matching result is more accurate.

16 Claims, 7 Drawing Sheets

| Post | | Resume | |
|---|---|---|---|
| Number: J12 | Post name: Marketing manager | Number: U58 | Expected post: Marketing manager |
| City: Shanghai | Education Requirement: No | Expected city: Beijing | Education background: Bachelor Degree |
| With or Without Business Trip: Yes | Recruiting Number: 2 | Living city: Beijing | Age: 33 |

Post description
1. Expand partners and undertake sales business.
2. Investigate and analyze the market operation.
3. Have at least three years' sales experience in similar industries.
4. Equipped with excellent ability in resource integration and market research.
5. Having contacts in electrical engineering companies or property management companies is preferred.

Working experience
1. Served as a sales manager for 4 years, with strong organizational and management skills.
2. Served as the person in charge of the electrical product promotion project in Shanghai, and has excellent team leadership skills.
3. Was a management planner, with standard Mandarin, strong coordination and adaptability.

Matching degree: 0

1 indicates match, 0 indicates no match

| Post | Resume |
|---|---|
| Number: J12    Post name: Marketing manager<br>City: Shanghai    Education Requirement: No<br>With or Without Business Trip: Yes    Recruiting Number: 2 | Number: U58    Expected post: Marketing manager<br>Expected city: Beijing    Education background: Bachelor Degree<br>Living city: Beijing    Age: 33 |
| Post description<br>1. Expand partners and undertake sales business.<br>2. Investigate and analyze the market operation.<br>3. Have at least three years' sales experience in similar industries.<br>4. Equipped with excellent ability in resource integration and market research.<br>5. Having contacts in electrical engineering companies or property management companies is preferred. | Working experience<br>1. Served as a sales manager for 4 years, with strong organizational and management skills.<br>2. Served as the person in charge of the electrical product promotion project in Shanghai, and has excellent team leadership skills.<br>3. Was a management planner, with standard Mandarin, strong coordination and adaptability. |
| Matching degree: 0 | 1 indicates match, 0 indicates no match |

FIG. 1

METHOD FOR PREDICTING MATCHING DEGREE BETWEEN RESUME AND POST, AND RELATED DEVICE

CROSS-REFERENCE TO RELATED APPLICATION

This application claims priorities from the Chinese patent application 202111548891.0 filed Dec. 17, 2021, the content of which is incorporated herein in the entirety by reference.

TECHNICAL FIELD

The disclosure relates to label classification technology, in particular to a method for predicting matching degree between a resume and a post, and a related device.

BACKGROUND

Person-post matching is a core of online recruitment service, which is used to predict matching degree between a post and a resume. In most of person-post matching methods, this task is simplified to match free-text attributes in the post and resume, thus achieving good performance. However, in these methods, contribution of semi-structured multivariate attributes such as educational history and salary is ignored, which may lead to unsuccessful prediction.

SUMMARY

In view of this, an object of this disclosure is to propose a method for predicting matching degree between a resume and a post, and a related device.

Based on the above object, a method for predicting matching degree between resume information and post information is provided in this disclosure, which includes:

obtaining a first key and a first value of a respective semi-structured post attribute in the post information and a second key and a second value of a respective semi-structured resume attribute in the resume information, the first key, the first value, the second key and the second value being all expressed in text data; and predicting the matching degree between the resume information and the post information by a prediction model including a cascaded pre-trained language model, a Transformer encoder and a single label classification model, based on the first key and the first value of the respective post attribute, a first source representation corresponding to the post information, the second key and the second value of the respective resume attribute, and a second source representation corresponding to the resume information.

Further, predicting the matching degree between the resume information and the post information includes:

for the first key and the first value of the respective post attribute, respectively encoding the first key and the first value into a semantic space through the pre-trained language model so as to obtain a first key embedding and a first value embedding, and fusing the first key embedding and the first value embedding so as to obtain a first fused embedding of the post attribute;

encoding the first source representation into the semantic space through the pre-trained language model so as to obtain a first source embedding;

for the second key and the second value of the respective resume attribute, respectively encoding the second key and the second value into the semantic space through the pre-trained language model so as to obtain a second key embedding and a second value embedding, and fusing the second key embedding and the second value embedding so as to obtain a second fused embedding of the resume attribute;

encoding the second source representation into the semantic space through the pre-trained language model so as to obtain a second source embedding;

performing internal interaction of a first matrix including the first fusion embedding of the respective post attribute so as to obtain a first internal-interaction-attribute embedding matrix and performing internal interaction of a second matrix including the second fusion embedding of the respective resume attribute so as to obtain a second internal-interaction-attribute embedding matrix, with the Transformer encoder;

fusing each element in the first internal-interaction-attribute embedding matrix respectively with the first source embedding so as to obtain a first updated embedding matrix;

fusing each element in the second internal-interaction-attribute embedding matrix respectively with the second source embedding so as to obtain a second updated embedding matrix;

performing external interaction between the first updated embedding matrix and the second updated embedding matrix with the Transformer encoder so as to obtain a first external-interaction-attribute embedding matrix and a second external-interaction-attribute embedding matrix; and predicting the matching degree between the resume information and the post information through the single label classification model according to the first external-interaction-attribute embedding matrix and the second external-interaction-attribute embedding matrix.

Further, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all include an additive fusing operation.

Further, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all include a concatenate fusing operation.

Further, performing the internal interaction of the first matrix so as to obtain the first internal-interaction-attribute embedding matrix includes: obtaining a first multi-head self-attention matrix using a multi-head self-attention mechanism in the Transformer encoder according to the first matrix; and obtaining the first internal-interaction-attribute embedding matrix according to the first multi-head self-attention matrix through a first fully connected feedforward layer in the Transformer encoder.

Performing the internal interaction of the second matrix so as to obtain the second internal-interaction-attribute embedding matrix includes: obtaining a second multi-head self-attention matrix using a multi-head self-attention mechanism in the Transformer encoder according to the second matrix; and obtaining the second internal-interaction-attribute embedding matrix according to the second multi-head self-attention matrix through a second fully connected feedforward layer in the Transformer encoder.

Further, performing the external interaction so as to obtain the first external-interaction-attribute embedding matrix and the second external-interaction-attribute embedding matrix includes:

concatenating the first updated embedding matrix and the second updated embedding matrix to obtain a joint matrix;

obtaining a multi-head self-attention joint matrix according to the joint matrix by using the multi-head self-attention mechanism in the Transformer encoder; and obtaining the first external-interaction-attribute embedding matrix and the second external-interaction-attribute embedding matrix according to the multi-head self-attention joint matrix through a third fully connected feedforward layer in the Transformer encoder.

Further, predicting the matching degree according to the first external-interaction-attribute embedding matrix and the second external-interaction-attribute embedding matrix includes:

respectively pooling the first external-interaction-attribute embedding matrix and the second external-interaction-attribute embedding matrix through a first pooling layer and a second pooling layer in the single label classification model so as to obtain a post vector and a resume vector;

aggregating the post vector and the resume vector to obtain an aggregated vector;

performing semantic fusion on the aggregated vector through a multilayer perceptron in the single label classification model, and obtaining a matching score by using a single neuron according to the aggregated vector subjected to the semantic fusion; and obtaining the matching degree of the resume information and the post information using an activation function according to the matching score.

Further, the pooling is performed by using an adaptive average pooling function provided by a machine learning framework PyTorch.

Further, the prediction model is trained by minimizing binary cross entropy loss.

On a basis of the same concept, an electronic device is also provided in this disclosure, which includes a memory, a processor and a computer program stored on the memory and operable on the processor, and the processor implements the method described in any one of the above when executing the program.

As can be seen from the above, in the method for predicting matching degree between the resume and the post, and the related device according to this disclosure, firstly the semi-structured keys and values in the post information and the resume information and their source are obtained. Then, the matching degree between the resume information and the post information is predicted by the prediction model including the cascaded pre-trained language model, the Transformer encoder and the single label classification model, based on the keys and values of the respective post information and resume information attribute, and corresponding source representations. Thus, by comprehensively searching internal interaction and external interaction of semi-structured multivariate attributes in person-post matching, the matching result is more accurate.

BRIEF DESCRIPTION OF THE DRAWINGS

In order to explain technical schemes in this disclosure or related technologies more clearly, the drawings required in the description of the embodiments or the related art will be briefly introduced below; obviously, the drawings in the following description are only embodiments of the present disclosure, and other drawings can be obtained according to these drawings by those of ordinary skill in the art without paying creative labor.

FIG. 1 is a schematic diagram of post and resume information according to an embodiment of the disclosure;

DETAILED DESCRIPTION

Figure 2:
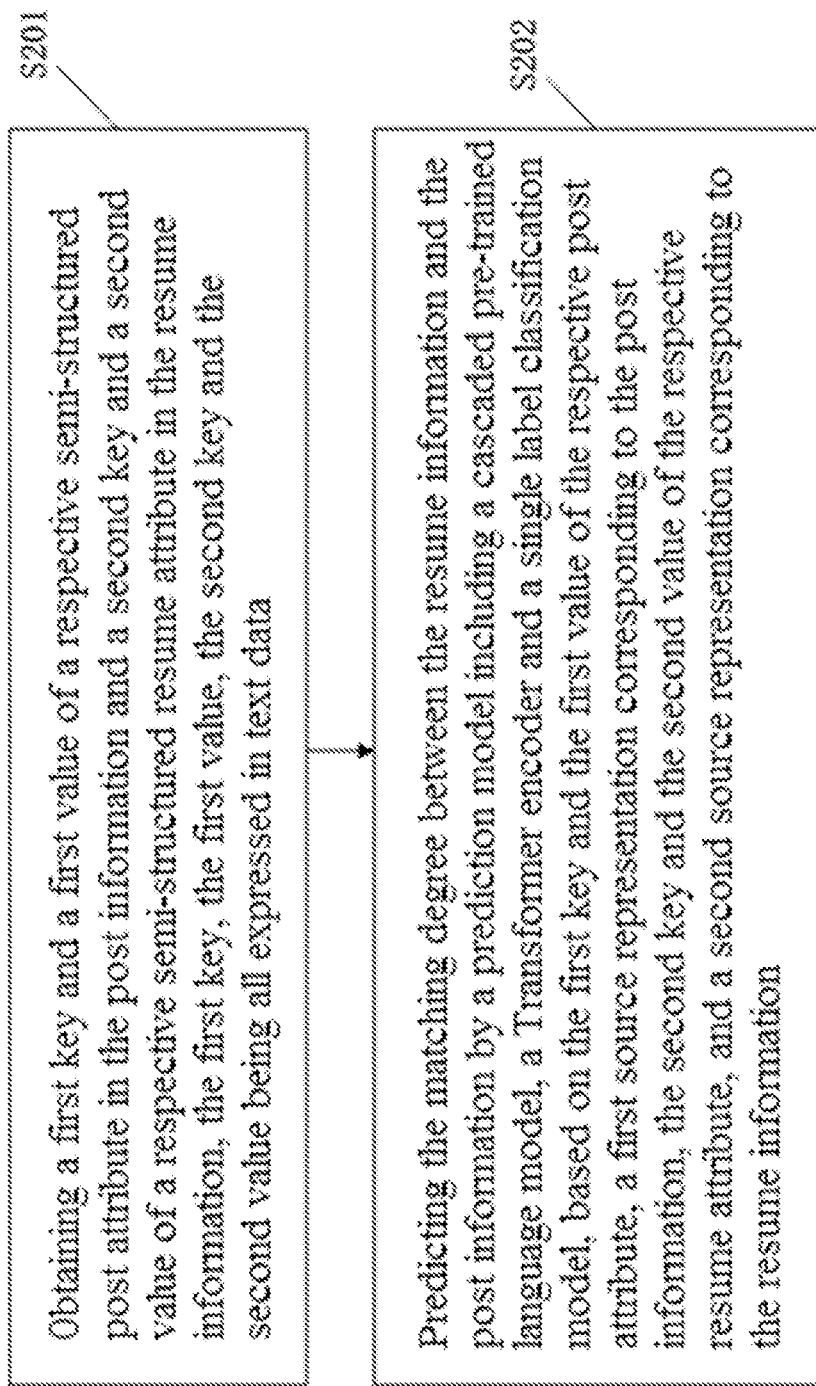
FIG. 2 is a flowchart of a method for predicting matching degree between a resume and a post according to an embodiment of the present disclosure.

In order to make the objects, technical schemes and advantages of the disclosure more clear, the disclosure will be further described in detail with reference to specific embodiments and drawings.

It should be noted that, unless otherwise defined, technical terms or scientific terms used in the embodiments of this disclosure shall have a general meaning understood by those with general skills in the field to which this disclosure pertains. Words "first", "second" and the like used in the embodiments of this disclosure do not indicate any order, quantity or importance, but are only used to distinguish different components. Similar words such as "including" or "containing" mean that the elements or objects appearing before the words encompass listed elements or objects appearing after the word and their equivalents, with other elements or objects being not excluded. Similar words such as "connected to" or "connected with" are not limited to physical or mechanical connection, but can include electrical connection, direct or indirect. An expression such as "upper", "lower", "left" and "right" is only used to express a relative positional relationship. When an absolute position of a described object changes, the relative positional relationship may also change accordingly.

As mentioned in the background art section, it is difficult for existing person-post matching schemes to meet a need for efficient and accurate person-post matching. In a process of implementing this disclosure, the applicant found that the existing person-post matching schemes ignores a fact that in the real world, posts and resumes are usually composed of semi-structured multivariate attributes (also called features), such as education history, city, salary, etc. Each attribute consists of a key (also called name) and a value (also called content). No consideration of some key attributes in the matching process may lead to inaccurate prediction results. For example, when only post description and work experience are considered in a person-post matching algorithm, it may be mistakenly believed that the matching degree between the post and the resume is very high, even if a working city in the post ("Shanghai") does not match an expected working city of a personnel ("Beijing") obviously. In a relevant solution, only entities are extracted from the post and the resume, which are then fused into characterization of free texts to enhance missing semantics. However, sources of the selected entities are not fully considered, and these entities are undoubtedly crucial for matching the post with the resume. Specifically, for example, in FIG. 1, an entity "Shanghai" in a city attribute of the post and an entity "Shanghai" in the working experience of a post seeker obviously cannot be treated equally in matching the post and the resume.

In addition, unlike in typical text matching tasks, sequential features and local interactions of texts can be well modeled by LSTM and CNN. From the semi-structured attributes of the post or resume, grammatical and contextual features can't be well modeled, because there is no clear relationship between multivariate attributes. Therefore, it is necessary to model complex relationships between multivariate attributes in the post or the resume (i.e. internal interaction). Meanwhile, external interaction between free text attributes of the post and the resume is also an important factor affecting the matching result.

In view of this, a scheme for predicting matching degree between a resume and a post is provided in one or more embodiments of this specification. Firstly semi-structured keys and values in post information and resume information and their source are obtained. Then, the matching degree between the resume information and the post information is predicted by the prediction model including the cascaded pre-trained language model, the Transformer encoder and the single label classification model, based on the keys and values of the respective post information and resume information attribute, and corresponding source representations. Thus, by comprehensively searching internal interaction and external interaction of semi-structured multivariate attributes in person-post matching, the matching result is more accurate. Technical solutions of specific embodiments of this disclosure will be described below.

Referring to FIG. 2, the method for predicting the matching degree between the resume and the post in one embodiment of this specification includes the following steps S201 and S202.

In step S201, a first key and a first value of a respective semi-structured post attribute in the post information and a second key and a second value of a respective semi-structured resume attribute in the resume information are obtained. The first key, the first value, the second key and the second value are all expressed in text data.

In this embodiment, in order to solve a problem of person-post matching, it is necessary to predict matching degree between post information released by a recruiter and resume information uploaded by a post seeker. Generally speaking, in online recruitment service, person-post matching data consists of three parts, namely, a post, a resume and an interactive record between the post and the resume. The post is composed of a work profile (for example, post name, city and salary) and post description (for example, requirement for skills or experience). The resume is composed of a personal profile of the post seeker (such as age, gender and educational history), and work experience (such as project experience in a previous/current company). The interactive record includes IDs of the post and the resume and their corresponding matching degree.

In this step, the post information and the resume information are composed of semi-structured multivariate attributes, where each attribute is composed of an attribute key and an attribute value. The attribute key is usually described in text data; and the attribute value can be text, category, number, etc. The attribute key and the attribute value follow a certain subordinate relationship, and can be easily converted into text data. For example, in a post, the attribute keys can be "post name", "minimum salary" and "whether to make a business trip", and their corresponding attribute values are given in forms of text, numbers and categories, for example, "Marketing Manager", "1000" and "Yes". We can easily convert them into "Marketing Manager", "1000 RMB" and "need to make a business trip" by a manual operation. An attribute source is used to indicate a source of the attribute, which indicates whether the attribute comes from the post information or the resume information.

In step S202, the matching degree between the resume information and the post information is predicted by a prediction model including a cascaded pre-trained language model, a Transformer encoder and a single label classification model, based on the first key and the first value of the respective post attribute, a first source representation corresponding to the post information, the second key and the second value of the respective resume attribute, and a second source representation corresponding to the resume information.

In this embodiment, through processing of semi-structured attribute keys, attribute values and attribute sources in the post information and the resume information, the matching degree between the resume information and the post information is finally obtained. With the relationship between semi-structured attributes in the post information and the resume information being considered, the matching result is more accurate.

Figure 3:
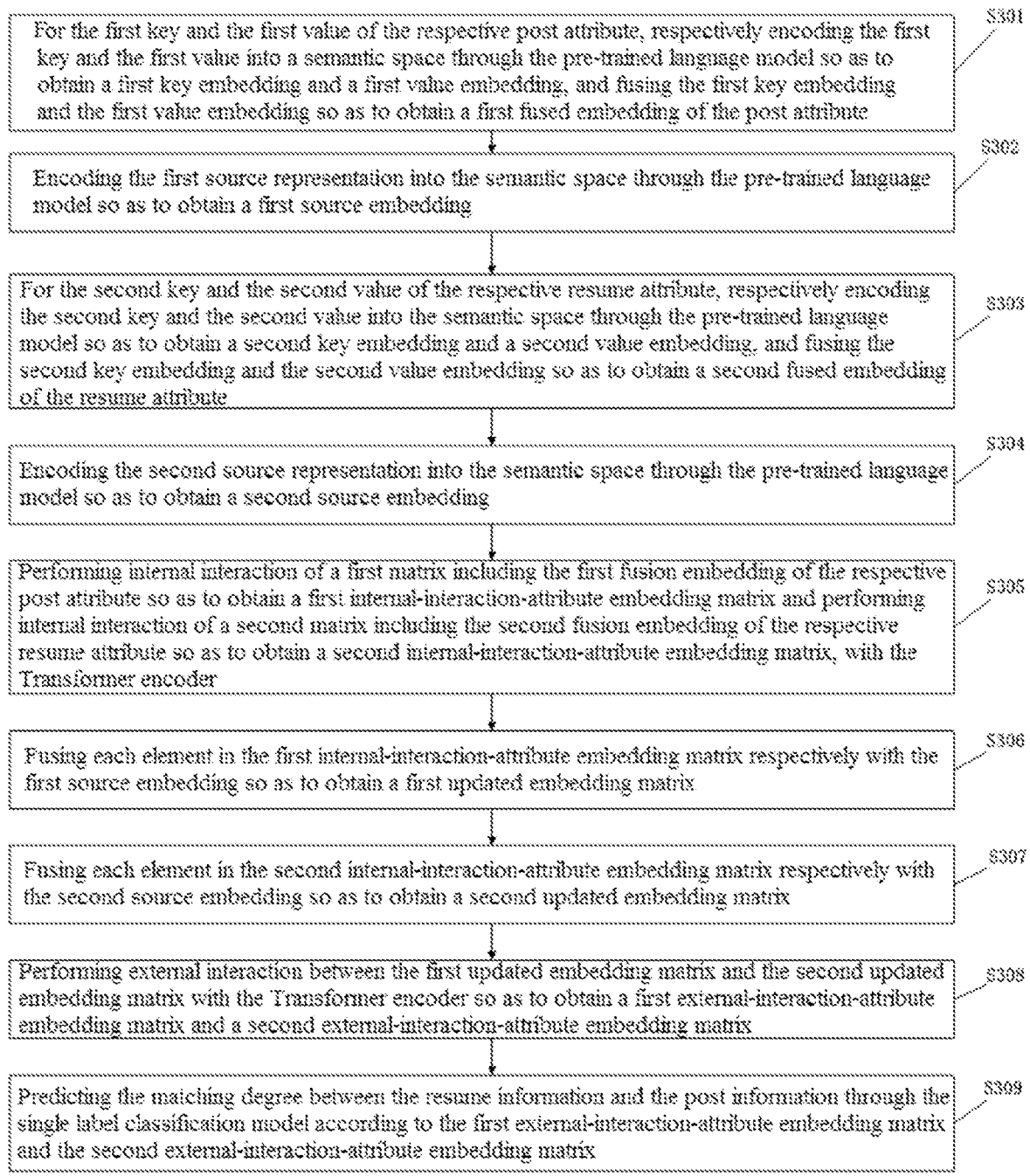
FIG. 3 is a flowchart of a method for predicting matching degree according to an embodiment of the present disclosure.

In other embodiments, referring to FIG. 3, predicting the matching degree between the resume information and the post information in a previous embodiment includes S301 to S309.

In step S301, for the first key and the first value of the respective post attribute, the first key and the first value are respectively encoded into a semantic space through the pre-trained language model so as to obtain a first key embedding and a first value embedding, and the first key embedding and the first value embedding are fused so as to obtain a first fused embedding of the post attribute.

In step S302, the first source representation is encoded into the semantic space through the pre-trained language model so as to obtain a first source embedding.

In step S303, for the second key and the second value of the respective resume attribute, the second key and the second value are respectively encoded into the semantic space through the pre-trained language model so as to obtain a second key embedding and a second value embedding, and the second key embedding and the second value embedding are fused so as to obtain a second fused embedding of the resume attribute.

In step S304, the second source representation is encoded into the semantic space through the pre-trained language model so as to obtain a second source embedding.

In this embodiment, obtaining the post information and the resume information in the previous embodiment further includes encoding sub-parts of attributes in the post information and the resume information (i.e. attribute keys, attribute values and attribute sources) into a same semantic space to unify representations of the sub-parts of attributes.

As a specific example, $\mathcal{J}$ and $\mathcal{R}$ symbols can be used to represent post information and resume information in an interactive record respectively:

$$\mathcal{J} = \{j_1, j_2, \ldots, j_m\},$$

$$\mathcal{R} = \{r_1, r_2, r_n\},$$

where, $j_i$ represents a i-th attribute of a post $\mathcal{J}$, $i \in \{1, 2, \ldots, m\}$. $r_j$ represents a i-th attribute of a resume $\mathcal{R}$, $j \in \{1, 2, \ldots, n\}$; m and n are corresponding numbers of attributes in $\mathcal{J}$ and $\mathcal{R}$. For the post $\mathcal{J}$, a key and a value of the i-th attribute $j_i$ are expressed as $j_i^k$ and $j_i^v$ respectively. Attributes in the resume $\mathcal{R}$ may be deduced by analogy In addition, $\mathcal{Y}_{<\mathcal{J},\mathcal{R}>} \in \{0,1\}$ is used to represent a binary label of a true matching result between the post $\mathcal{J}$ and the resume $\mathcal{R}$. 0 indicates no match (negative instance), and 1 indicates matching (positive instance).

Based on above symbols, the person-post matching task can be expressed as learning a prediction function from existing post-resume interaction records, so as to accurately predict matching degree of a post-resume pair that have not been seen before. A common process is to construct a person-post matching algorithm, encode the post and the resume into a potential vector, and then apply a classification function to predict the matching degree. The above process can be expressed as:

$$\mathcal{Y}'_{<\mathcal{J},\mathcal{R}>} = \mathcal{F}(\mathcal{J},\mathcal{R}),$$

where $\mathcal{Y}'_{<\mathcal{J},\mathcal{R}>}$ is predicted matching degree between the post $\mathcal{J}$ and the resume $\mathcal{R}$. $\mathcal{F}(\mathcal{J},\mathcal{R})$ is a prediction function, with a purpose of making $\mathcal{Y}'_{<\mathcal{J},\mathcal{R}>}$ as possible to a real matching label $\mathcal{Y}_{<\mathcal{J},\mathcal{R}>}$.

In this embodiment, the sub-parts of the respective attribute in the post information and the resume information is encoded by a pre-trained language model BERT, with a formula as follows:

$$j_i^k = \text{BERT}(j_i^k),$$

$$j_i^v = \text{BERT}(j_i^v),$$

$$r_j^k = \text{BERT}(r_j^k),$$

$$r_j^v = \text{BERT}(r_j^v),$$

where $j_i^k, j_i^v, r_j^k, r_j^v \in \mathbb{R}^{d_{em}}$ are attribute keys and attribute values corresponding to the i-th attribute in $\mathcal{J}$ and the j-th attribute in $\mathcal{R}$, $i \in \{1, 2, \ldots, m\}$ and $j \in \{1, 2, \ldots, n\}$. $d_{em}$ is a preset dimension of a BERT output. Similarly, a source coding process is as follows:

$$j^s = \text{BERT}(j^s),$$

$$r^s = \text{BERT}(r^s),$$

where $j^s, r^s \in \mathbb{R}^{d_{em}}$ are attribute sources corresponding to the attributes in $\mathcal{J}$ and $\mathcal{R}$. In this embodiment, a hidden state and a pooling operation of a last layer of the BERT are adopted to obtain the output attribute keys, attribute values and attribute sources.

In this embodiment, a corresponding relationship is required to be established between the obtained attribute keys and attribute values, and each attribute key and a corresponding attribute value feature are fused so as to obtain embeddings of all of features after fusing. A first fused embedding corresponds to the post, a second fused embedding corresponds to the resume, and each element in the embedding corresponds to a specific attribute.

Specifically, the attribute values and attribute keys of each of the attributes in $\mathcal{J}$ and $\mathcal{R}$ are fused and embedded as follows:

$$j_i^a = j_i^v \oplus j_i^k, i \in \{1, 2, \ldots, m\},$$

$$r_j^a = r_j^{98} \oplus r_j^k, j \in \{1, 2, \ldots, n\},$$

where $j_i^a, r_k^a \in \mathbb{R}^{d_{in}}$ are fused and embedded expressions of the i-th attribute in $\mathcal{J}$ and the j-th attribute in $\mathcal{R}$ respectively, and $d_{in}$ is a vector dimension after the attribute value and attribute key are fused.

After the above fusing and embedding operation is performed on all of attributes in $\mathcal{J}$ and $\mathcal{R}$, matrices of a and $\mathcal{J}$ and $\mathcal{R}$ can be obtained as shown below:

$$X_J = [j_1^a; j_2^a; \ldots; j_m^a],$$

$$X_R = [r_1^a; r_2^a; \ldots; r_n^a],$$

where $X_J \in \mathbb{R}^{m \times d_{in}}$ and $X_R \in \mathbb{R}^{n \times d_{in}}$ are matrix representations of $\mathcal{J}$ and $\mathbb{R}$, respectively (i.e. a first matrix and a second matrix).

In step S305, internal interaction of a first matrix including the first fusion embedding of the respective post attribute is performed with the Transformer encoder so as to obtain a first internal-interaction-attribute embedding matrix, and internal interaction of a second matrix including the second fusion embedding of the respective resume attribute is performed with the Transformer encoder so as to obtain a second internal-interaction-attribute embedding matrix;

In this step, in order to capture the relationship among multivariate attributes, performing the internal interaction of the first matrix so as to obtain the first internal-interaction-attribute embedding matrix includes: obtaining a first multi-head self-attention matrix using a multi-head self-attention mechanism in the Transformer encoder according to the first matrix; and obtaining the first internal-interaction-attribute embedding matrix according to the first multi-head self-attention matrix through a first fully connected feedforward layer in the Transformer encoder.

Performing the internal interaction of the second matrix so as to obtain the second internal-interaction-attribute embedding matrix includes: obtaining a second multi-head self-attention matrix using a multi-head self-attention mechanism in the Transformer encoder according to the second matrix; and obtaining the second internal-interaction-attribute embedding matrix according to the second multi-head self-attention matrix through a second fully connected feedforward layer in the Transformer encoder.

As a specific example:

$$M_J^h = \text{softmax}\left(\frac{(X_J \cdot Q_J^h)(X_J \cdot K_J^h)^T}{\sqrt{d_{in}}}\right) X_J \cdot V_J^h,$$

$$M_R^h = \text{softmax}\left(\frac{(X_R \cdot Q_R^h)(X_R \cdot K_R^h)^T}{\sqrt{d_{in}}}\right) X_R \cdot V_R^h,$$

$$M_1 = \text{concat}(M_J^1, M_J^2, \ldots, M_J^H) \cdot O_J,$$

$$M_R = \text{concat}(M_R^1, M_R^2, \ldots, M_R^H) \cdot O_R,$$

where and $Q_J^h, Q_R^h \in \mathbb{R}^{d_{in} \times d_q}$, $K_J^h, K_R^h \in \mathbb{R}^{d_{in} \times d_k}$, $V_J^h, V_R^h \in \mathbb{R}^{d_{in} \times d_{vk}}$ and $O_J, O_R \in \mathbb{R}^{H \cdot d_v \times d_{in}}$ are trainable network parameters; $h \in \{1, 2, \ldots H\}$, H represents a number of headers of the Transformer encoder. In this embodiment, it is set $d_q = d_k = d_v = d_{in}/H$. $M_J^h$ and $M_R^h$ are self-attention matrix representations of $\mathcal{J}$ and $\mathcal{R}$ at a h-th head. $M_J$ and $M_R$ are multi-head self-attention matrix representations of $\mathcal{J}$ and $\mathcal{R}$ (that is, a multi-head self-attention matrix of the post and a multi-head self-attention matrix of the resume).

Afterward, the multi-head self-attention matrix of the post and the multi-head self-attention matrix of the resume are input into the feedforward layer of the Transformer encoder so as to obtain internal interaction representations of $\mathcal{J}$ and $\mathcal{R}$ (i.e. internal-interaction-attribute embedding matrix of the post and internal-interaction-attribute embedding matrix of the resume) as follows:

$$M_J = \text{feedforward}(M_J),$$
$$= [j_1^{a'}; j_2^{a'}; \ldots ; j_m^{a'}],$$
$$M_R = \text{feedforward}(M_R),$$
$$= [r_1^{a'}; r_2^{a'}; \ldots ; r_n^{a'}],$$

where $j_i^{a'}, r_j^{a'} \in \mathbb{R}^{d_{in}}$ are respectively internal-interaction-attribute embeddings of the i-th attribute in $\mathcal{J}$ and the j-th attribute in $\mathcal{R}$, $i \in \{1,2, \ldots, m\}$ and $j \in \{1,2, \ldots, n\}$.

In step S306, each element in the first internal-interaction-attribute embedding matrix respectively is fused with the first source embedding so as to obtain a first updated embedding matrix.

In step S307, each element in the second internal-interaction-attribute embedding matrix respectively is fused with the second source embedding so as to obtain a second updated embedding matrix.

This step mainly focus on the multivariate attribute interaction between the post and the resume. Further, the attribute sources are fused into the attributes subjected to the internal interaction so as to present sources of the attributes, and to generate an updated matrix representation for the post and the resume. Corresponding relations are required between the obtained attributes and attribute sources, and each attribute source and a corresponding attribute feature are fused and embedded so as to obtain the first updated embedding matrix corresponding to the post and the second updated embedding matrix corresponding to the resume, and each element in the matrix corresponds to a specific attribute.

It can be specifically expressed as:

$$j_i^{a'} = j_i^{a} \oplus j^s, i \in \{1,2, \ldots, m\},$$
$$r_j^{a'} = r_j^{a} \in r^s, j \in \{1,2, \ldots, n\},$$
$$M_J = [j_1^{a'}; j_2^{a'}; \ldots ; j_m^{a'}],$$
$$M_R = [r_1^{a'}; r_2^{a'}; \ldots ; r_n^{a'}],$$

where $j_i^{a'}, r_j^{a'} \in \mathbb{R}^{d_{ex}}$ are fused representations of attribute-source features of the i-th attribute in $\mathcal{J}$ and the j-th attribute in $\mathcal{R}$ respectively, wherein $d_{ex}$ is a vector dimension after the attribute value, attribute key, and attribute source are fused.

In step S308, external interaction between the first updated embedding matrix and the second updated embedding matrix is performed with the Transformer encoder so as to obtain a first external-interaction-attribute embedding matrix and a second external-interaction-attribute embedding matrix.

Figure 4:
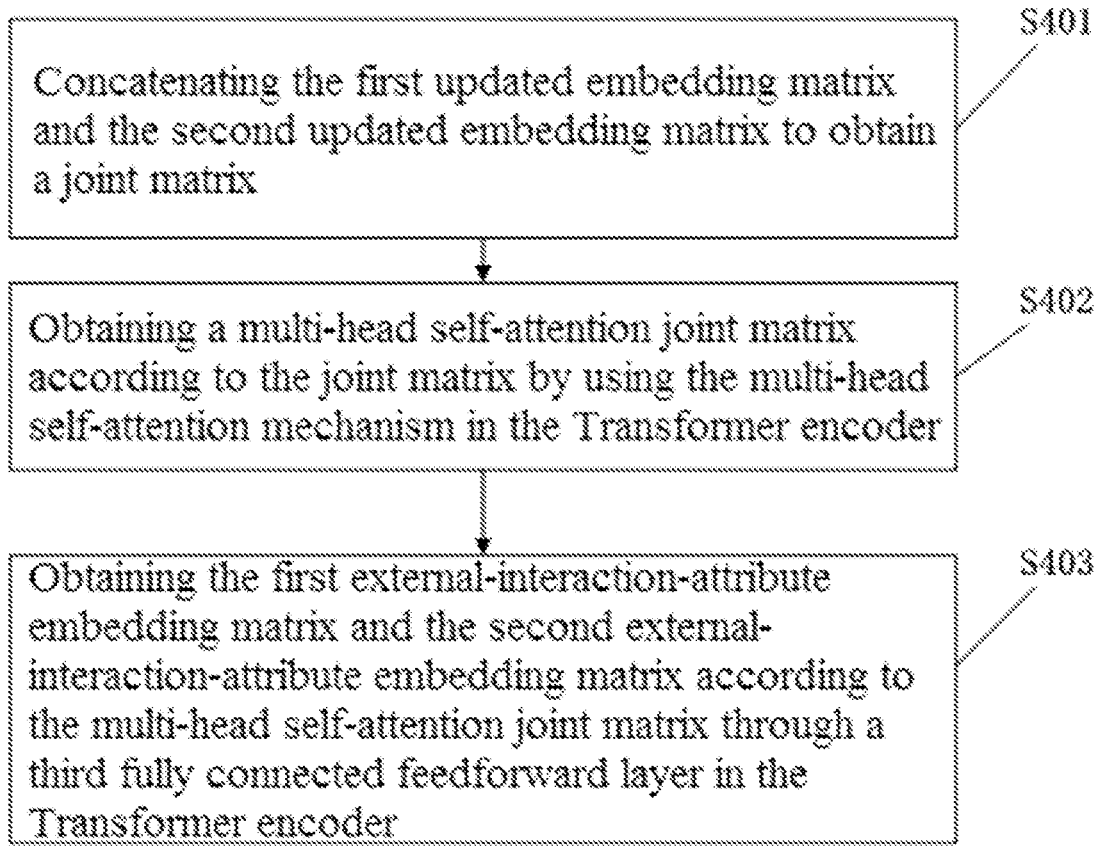
FIG. 4 is a schematic diagram of a process for generating an external-interaction-attribute embedding matrix according to an embodiment of the present disclosure.

In this step, when the external interaction is modeled, it is necessary to obtain the first external-interaction-attribute embedding matrix of the post and the second external-interaction-attribute embedding matrix of the resume by means of the multi-head self-attention mechanism and the feedforward neural network in the Transformer encoder. Specifically, referring to FIG. 4, it may further include the following steps S401 to S403.

In step S401, the first updated embedding matrix and the second updated embedding matrix is concatenated to obtain a joint matrix.

In step S402, a multi-head self-attention joint matrix is obtained according to the joint matrix by using the multi-head self-attention mechanism in the Transformer encoder.

In step S403, the first external-interaction-attribute embedding matrix and the second external-interaction-attribute embedding matrix are obtained according to the multi-head self-attention joint matrix through a third fully connected feedforward layer in the Transformer encoder.

Specifically, a second post attribute matrix $M_J$, and a second resume attribute matrix $M_R$, of $\mathcal{J}$ and $\mathcal{R}$ are combined into a joint matrix $X_E$:

$$X_E = [j_1^{a'}; j_2^{a'}; \ldots ; j_m^{a'}; r_1^{a'}; r_2^{a'}; \ldots ; r_n^{a'}],$$

Then, the multi-head self-attention layer is used to capture a multivariate-attribute relationship between $\mathcal{J}$ and $\mathcal{R}$, and the joint matrix is input into the self-attention layer of the Transformer encoder to obtain the multi-head self-attention joint matrix as follows:

$$M_E^h = \text{softmax}\left(\frac{(X_E \cdot Q_E^h)(X_E \cdot K_E^h)^T}{\sqrt{d_{ex}}}\right) X_E \cdot V_E^h,$$

$$M_E = \text{concat}(M_E^1, M_E^2, \ldots, M_E^H) \cdot O_E,$$

where $Q_E \in \mathbb{R}^{d_{ex} \times d_q}$, $K_E \in \mathbb{R}^{d_{ex} \times d_k}$, $V_E \in \mathbb{R}^{d_{ex} \times d_v}$ and $O_E \in \mathbb{R}^{H \cdot d_v \times d_{ex}}$ are trainable network parameters; $h \in \{1,2, \ldots, H\}$, H represents a number of headers of the Transformer encoder. It is set $d_q = d_k = d_v = d_{ex}/H$. Afterwards, $M_E^h$ is a self-attention joint representation of $\mathcal{J}$ and $\mathcal{R}$ at a h-th head. $M_E$ is the multi-head self-attention joint matrix of $\mathcal{J}$ and $\mathcal{R}$.

Finally, the fully connected feedforward layer is adopted for $M_E$ so as to obtain external interaction representations of $\mathcal{J}$ and $\mathcal{R}$, and the multi-head self-attention joint matrix is input into the third fully connected feedforward layer of the Transformer encoder to obtain an external-interaction-attribute embedding matrix of the post and an external-interaction-attribute embedding matrix of the resume, as shown below:

$$M_E = \text{feedforward}(M_E),$$
$$= [j_1^{a''}; j_2^{a''}; \ldots ; j_m^{a''}; r_1^{a''}; r_2^{a''}; \ldots ; r_n^{a''}],$$
$$M_{J''} = [j_1^{a''}; j_2^{a''}; \ldots ; j_m^{a''}],$$
$$M_{R''} = [r_1^{a''}; r_2^{a''}; \ldots ; r_n^{a''}],$$

where $j_i^{a''}$ and $r_j^{a''}$ are external-interaction-attribute embedding representations of the i-th attribute in $\mathcal{J}$ and the j-th attribute in $\mathcal{R}$, $i \in \{1,2, \ldots, m\}$ and $j \in \{1,2, \ldots, n\}$. Finally, $M_{J''}$ and $M_{R''}$ are external-interaction-attribute embedding matrices of $\mathcal{J}$ and $\mathcal{R}$ respectively.

In step S309, the matching degree between the resume information and the post information is predicted through the single label classification model according to the first external-interaction-attribute embedding matrix and the second external-interaction-attribute embedding matrix.

In this step, after exploring the internal and external interaction of semi-structured multivariate attributes, rich representations of the post and the resume are obtained. By analyzing external-interaction-attribute embedding matrices of the post and the resume, a result of the person-post matching can be obtained, as shown in FIG. 1.

It can be seen from the above that in the embodiments of the present disclosure, the keys, values and sources of the post information and the resume information are firstly obtained. Then, the internal interaction between the key and the value of the post and the internal interaction between the key and the value of the resume and, the external interaction of the sources and the keys and values between the post and the resume are modeled hierarchically. The key embedding and the source embedding are fused into the value embedding, respectively, so as to clearly indicate the key and the source corresponding to the value in the attribute. Finally, the matching degree between the post and the resume is predicted according to the external-interaction-attribute embedding matrices of the post and the resume. Thus, by comprehensively searching internal interaction and external interaction of the semi-structured multivariate attributes in the person-post matching, the matching result is more accurate.

In other embodiments, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding in previous embodiments all include an additive fusing operation.

In other embodiments, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding in previous embodiments all include a concatenate fusing operation.

In this disclosure, feature fusing and embedding of the attribute key and the attribute value can be either additive fusion or concatenate fusion. In the additive fusion, a number of elements of the obtained matrix is a sum of a number of the attribute keys and a number of the attribute values, while in concatenate fusion, number of elements of the obtained matrix is the same as that of the attribute keys.

Specifically, a fusing and embedding process can be expressed as:s $$j_i^a = j_i^v \oplus j_i^k, i \in \{1,2,\ldots,m\},$$

$$r_j^a = r_j^v \oplus r_j^6, j \in \{1,2,\ldots,n\},$$

where $\oplus$ indicates an additive or concatenate fusion operation according to actual experimental effect, $j_i^a$, $r_j^a \in \mathbb{R}^{d_{in}}$ are fused expressions of the i-th attribute in $\mathcal{J}$ and the j-th attribute in $\mathcal{R}$. $d_{in}$ can be $d_{em}$ or $2 \cdot d_{em}$, depending on an adopted fusion strategy, in the additive fusion, $d_{in}$ 是 $2 \cdot d_{em}$, and in the concatenate fusion, $d_{in}$ is $d_{em}$.

Figure 5:
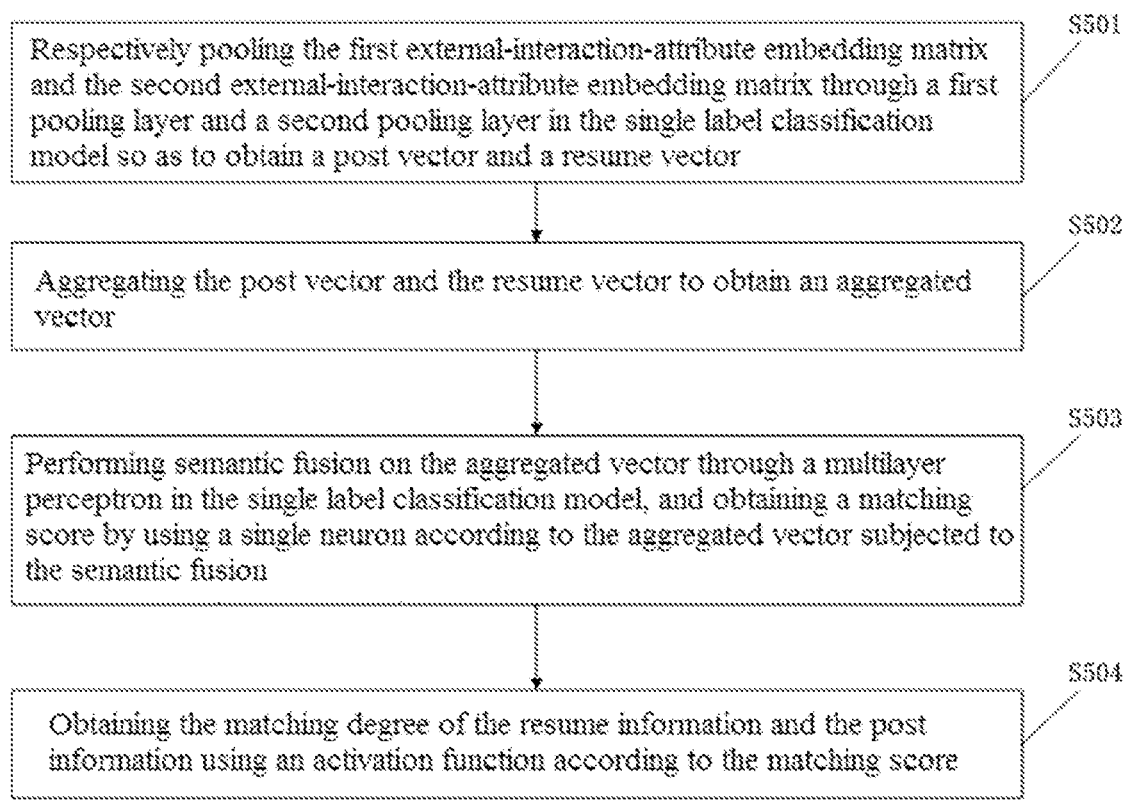
FIG. 5 is a schematic diagram of a process for generating matching degree of post information and resume information according to an embodiment of the present disclosure.

In other embodiments, referring to FIG. 5, predicting the matching degree according to the first external-interaction-attribute embedding matrix and the second external-interaction-attribute embedding matrix in the previous embodiment includes steps S501 to S504.

In step S501, the first external-interaction-attribute embedding matrix and the second external-interaction-attribute embedding matrix are respectively pooled through a first pooling layer and a second pooling layer in the single label classification model so as to obtain a post vector and a resume vector.

In step S502, the post vector and the resume vector are aggregated to obtain an aggregated vector.

In step S503, semantic fusion is performed on the aggregated vector through a multilayer perceptron in the single label classification model, and a matching score is obtained by using a single neuron according to the aggregated vector subjected to the semantic fusion.

In step S504, the matching degree of the resume information and the post information is obtained using an activation function according to the matching score.

In this embodiment, firstly, a pool layer is used to convert matrix representations of the post and the resume into vector representations, and vectors of the post and the resume are aggregated, and then the aggregated vector is sent to the Multi-Layer Perceptron (MLP) for further semantic fusion. A single neuron can be used to output a matching score, and finally the matching result can be obtained by using the activation function according to the matching score. Specifically, the matching score is mapped to a range of [0, 1]. According to actual needs, a post and a resume within a preset range can be selected to output a positive or negative result. For example, a matching result in [0, 0.5] can be selected as failed matching, with an output of 0; a matching result in [0.5, 1] can be selected as successful matching, with an output of 1. 0 indicates no match (negative instance), and 1 indicates matching (positive instance).

As a specific example, firstly, the pool layer is used to convert the matrix representations of $\mathcal{J}$ and $\mathcal{R}$ into vector representations as follows:

$$J = \text{pooling}(M_{\mathcal{J}''}),$$

$$R = \text{pooling}(M_{\mathcal{R}''}),$$

where J and R are vector representations of $\mathcal{J}$ and $\mathcal{R}$, respectively. In this embodiment, an adaptive average pooling function provided by an open source machine learning framework PyTorch is adopted.

Next, vectors of $\mathcal{J}$ and $\mathcal{R}$ are aggregated, and then the aggregated vector are sent to the Multi-Layer Perceptron (MLP) for further semantic fusion. Then, the single neuron is used to output the matching score as a prediction label. In this embodiment, a label prediction process is formulated as follows:

$$g_{JR} = \text{concat}(J, R, J-R)$$

$$\mathcal{Y}'_{<\mathcal{J},\mathcal{R}>} = \text{sigmoid}(MLP(g_{JR}))$$

where $g_{JR}$ is the aggregated vector of $\mathcal{J}$ and $\mathcal{R}$; In this embodiment, MLP refers to a multilayer perceptron with two nonlinear layers and one ReLu layer, and sigmoid is used to map the matching score to the range of [0,1]. Specifically, the matching score is mapped to the range of [0,1] by sigmoid. According to actual needs, a post and a resume within a preset range can be selected to output a positive or negative result. Generally, a prediction threshold is set to be 0.5 by default. If a predicted matching degree of a sample exceeds 0.5, it can be classified as a positive sample, that is, the current post matches the current resume. Otherwise, it is a negative sample.

In other embodiments, the pooling in a previous embodiment is performed by using an adaptive average pooling function provided by a machine learning framework PyTorch.

In other embodiments, the prediction model in a previous embodiment is trained by minimizing binary cross entropy loss.

In other embodiments, in order to make an output result of a model (an internal and external interaction model, called an InEXIT model for short) constructed according to the method for predicting the matching degree between the resume and the post in this disclosure more accurate, it is necessary to train the model. In a training stage of the model, each of training instances consists of a post $\mathcal{J}$, a resume $\mathcal{R}$ and their corresponding matching degrees $\mathcal{Y}_{<\mathcal{J},\mathcal{R}>} \in \{0,1\}$. In this embodiment, a mini-batch strategy is used to randomly select training instances from a training set. Parameters of the model are trained by minimizing following binary cross entropy loss to obtain an optimum training round:

$$\mathcal{L} = -1/N \Sigma_{i=1}^{N} (\mathcal{Y}_i \log(\mathcal{Y}'_i) + (1-\mathcal{Y}_i)\log(1-\mathcal{Y}'_i)),$$

where $\mathcal{Y}_i$ is a true matching degree of a i-th training instance; $\mathcal{Y}'_i$ is a predicted matching degree of the i-th training instance generated by the model; N is a total number of training instances. In this embodiment, exponential decay is used to train the model to change a learning rate of each training round so as to avoid over-fitting.

Figure 6:
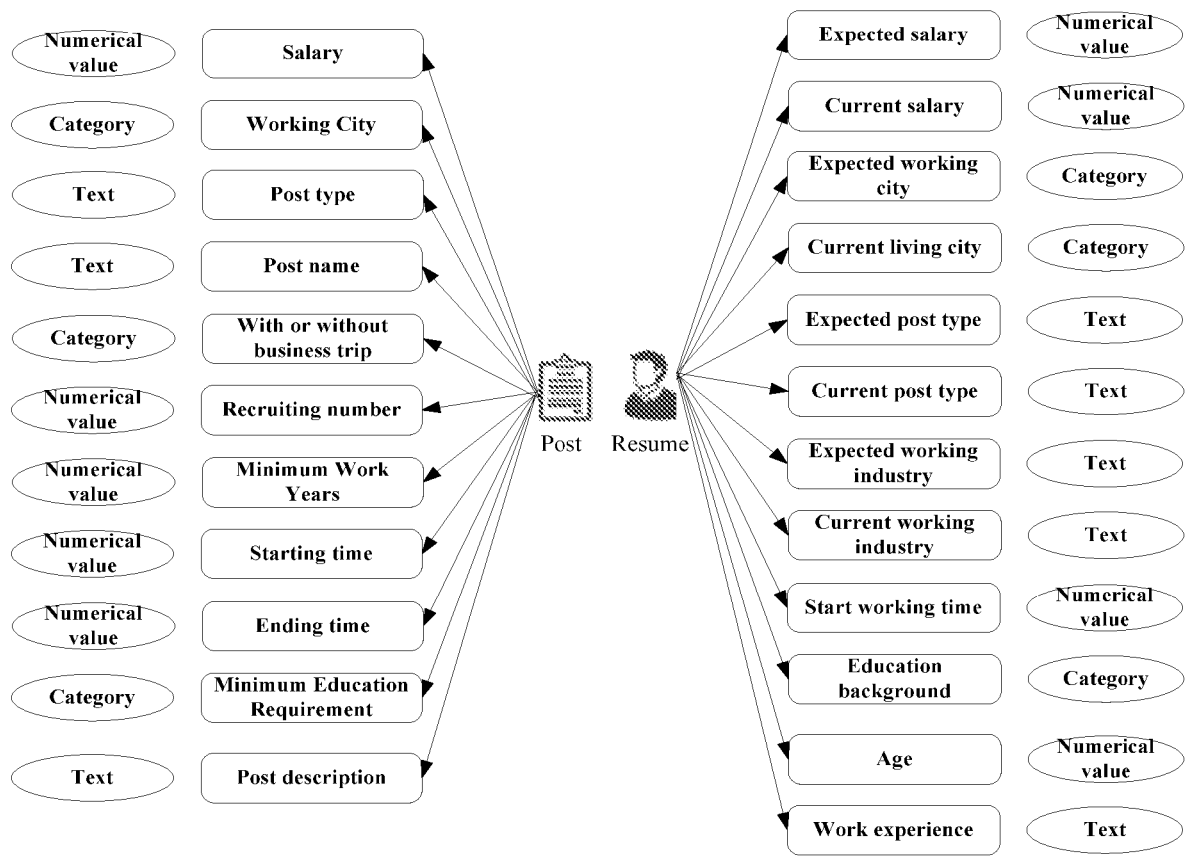
FIG. 6 is a schematic diagram of multivariate attributes in a post and a resume according to an embodiment of the present disclosure.

As a specific example, a real person-post matching data set containing semi-structured multivariate attributes is constructed from a public data set provided by an intelligent person-post matching contest. For all of original data, firstly, the data is cleaned by deleting those posts and resumes with incomplete attributes. Then, interaction history that has no clear signal to indicate whether the current post matches the resume is filtered. It is worth noted that in the original data, there are much more mismatched instances (negative instances) than matched instances (positive instances). In order to reduce deviation of the data, a same number of negative instances as the positive instances were randomly selected. Finally, 80% of useful interaction history is randomly divided for training, 10% of the useful interaction history is divided for verification, and remaining 10% of the useful interaction history is divided for testing. In order to protect privacy of personnel and companies, all of interaction histories are anonymized, and identity attributes such as gender, name, address, etc. are deleted. Statistics of processed data sets are summarized in Table 1. As shown in Table 1, it is worth mentioned that for a post and a resume, there are 11 and 12 attributes respectively, and each of the attributes contains 28.20 and 14.74 words on average. Generally, a large number of attributes may bring greater challenges in predicting accurate matching degree between the post and the resume by a person-post matching method. In addition, the multivariate attributes in the post and the resume are described in detail in FIG. 6, including different attribute sources, namely description of attribute keys in the post and the resume, and a corresponding value type of each of the attribute keys, which can be a numerical value, text and category, is introduced.

TABLE 1

| Data-set Statistics | |
| --- | --- |
| Category | Numerical value |
| number of posts | 41,533 |
| number of resumes | 4,475 |
| number of attribution in post | 11 |
| number of attribution in resume | 12 |
| average words of each attribution in the part | 28.20 |
| average words of each attribution in the resume | 14.74 |
| number of interaction histories | 57,190 |
| number of positive instances | 28,595 |
| number of negative instances | 28,595 |
| number of training samples | 45,752 |
| number of verification samples | 5,719 |
| number of test samples | 5,719 |

Next, validity of the model constructed by the person-post matching method according to this disclosure is tested by comparing with a competitive person-post matching baseline model. The baseline model and the model according to this disclosure are summarized as follows:

PJFNN: A model based on a CNN, in which two CNNs are used to explore semantic representation of post description and work experience. Its matching degree is calculated by cosine similarity.

BPJFNN: A model based on a RNN, which uses BiLSTM instead of CNN as a feature extractor. In addition, it also uses an aggregation layer to predict matching degree between a post and a resume.

JRMPM: It uses a content memory module to explore preferences of a recruiter and a job seeker, which are then used to enrich their representations.

APJFNN: An improved version of BPJFNN, which puts forward a hierarchical recursive attention model, which comprehensively learns perception representation of the post and the resume.

MV-CoN: It includes a text-based and relationship-based matching component, followed by a common teaching mechanism, with a purpose to learn matching from sparse and noisy JRM interactive data.

InEXIT: A model established by the person-post matching method according to this disclosure, in which the internal and external interactions are discussed, and which focuses on comprehensive modeling of semi-structured multivariate attributes in person-post matching.

In this specific example, all verification experiments are implemented with Python and the open source machine learning framework PyTorch, and executed on a server equipped with an NVIDIA RTX3090 GPU graphics card. Sub-part embeddings of the attributes are initialized by a pre-trained BERT-Base-Chinese language model, with a dimension $d_{em}=768$. A hidden-layer size and a number of heads of the multi-head attention mechanism are set to be 768 and 8 respectively. To reduce complexity of the model, sub-parts of the attributes with different lengths in this embodiment are filled/truncated. Specifically, lengths of values of post description and work experience are set to be 256, but set to be 16 for remaining sub-parts.

In optimizing parameters of the model, in this embodiment, an Adaptive Moment (Adam) optimizer is used to train the model for up to 20 rounds. An early stop mechanism is adopted to determine the optimum round of training. If an ACC indicator on a verification set does not increase for five consecutive rounds, the training may be terminated in advance. Layer normalization and gradient clipping are also adopted to avoid over-fitting. A batch-training size is 16, and a dropout rate is 0.1. An initial learning rate is $4*10^{-6}$, and a decay rate of the learning rate is $1*10^{-9}$. As for a fusion strategy, it is observed through experiments that optimum performance can be achieved when an additive operation is adopted in a step-by-step fusion mechanism.

Reference is made to Table 2, which shows performance of several existing baseline models and InEXIT on AUC, ACC, Precision, Recall and F1 scores, in which the results of an optimum baseline and optimum model in each column are underlined and bolded respectively.

TABLE 2

| Model | AUC(%) | ACC(%) | Precision(%) | Recall(%) | F1(%) |
|---|---|---|---|---|---|
| PJFNN[44] | 68.25 | 63.65 | 63.99 | 63.61 | 63.80 |
| BPJFNN[26] | 70.96 | 65.71 | 66.09 | 65.52 | 65.81 |
| JRMPM[40] | 71.22 | 65.57 | 65.63 | 66.42 | 66.02 |
| APJFNN[26] | 71.45 | 66.13 | 66.62 | 65.62 | 66.19 |
| MV-CoN[3] | 72.38 | 66.85 | 67.28 | 66.53 | 66.90 |
| InEXIT | 75.48 | 69.59 | 70.51 | 68.09 | 69.28 |

Specifically, InEXIT is improved by 4.28%, 4.10%, 4.80%, 2.34% and 3.56% compared with the optimum baseline Mv-CoN in AUC, ACC, Precision, Recall and F1 indicators, respectively. Difference between predicted results of InEXIT and the optimum baseline Mv-CoN in this embodiment was detected by a two-tailed paired t-test at a level of 0.01, which had statistical significance. It is worth noted that InEXIT has highest performance improvement (4.80%) on a Precision indicator, while the optimum baseline Mv-CoN has lowest improvement (2.34%) on a Recall indicator. This difference shows that there are more positive instances being wrongly classified as negative instances, but not more negative instances being wrongly classified as positive instances, compared with negative instances being wrongly classified as positive instances. This may be due to consideration of too many attributes and introduction of additional noise in the matching mode, which makes it more difficult to accept matching between a post and a resume than to reject it. Phenomenon observed in the overall performance demonstrate that considering the semi-structured multi-attributes can facilitate the person-post matching to a certain extent. Compared with existing related methods, the person-post matching method according to the disclosure has certain advantages.

A specific implementation scenario is given below, in which post information is as follows:

Post Name: Operation Supervisor Salary: 6001 to 8000
With or Without Business Trip: Yes Working City: C530
Recruiting Number: 3 Minimum Work Years: 3 years
Post Type: No Minimum Education Requirement: Bachelor Degree
Starting time: Feb. 19, 2019 Ending time: Mar. 31, 2019.
Post Description
1. Assist the operation manager to complete planned tasks of the department.
2. Instruct and supervise the operation assistant to carry out various tasks, and conduct regular training and assessment.
3. Be responsible for daily operation of the area under jurisdiction.
4. Keep a good cooperative relationship with merchants, follow up and pay return visits to maintenance and complaints in time.
5. Be responsible for checking and supervising service standards and working conditions of the staff.
6. Patrol the store on time and solve problems in time, such as fire hazards, safety facilities failures, etc.
7. Responsible for collecting rent, property fee, energy belt and other related expenses during lease terms.
Resume Information is as Follows.
Expected salary: 10001 to 15000 Current salary: 10001 to 15000
Expected working city: C530 Current living city: C530
Start working time: 2015 Age: 36
Education background: junior college Current post type: none
Expected industry: property management, construction engineering Current industry: property management of business center Expected post type: property management, production management, operation
Work Experience
1. Worked as a customer service worker, conducted business negotiations with merchants, handled consumer complaints, and was good at maintaining mass relations.
2. Served as a property manager, assisted the operation department in property management.
3. Good at staff management, training, assessment and team construction.
4. Was responsible for fire inspection, public safety, supervision and inspection of public facilities.
5. Was responsible for daily operation of the mall, presided over various affairs, and kept documents and information.

In this example, matching results predicted by the optimum baseline model Mv-CoN and the InEXIT according to the embodiment of this disclosure are: MV-CON: 0.58, InEXIT: 0.17, respectively. A corresponding true matching result is 0, that is, no match.

A predicted matching degree of 0.58 between the current post and resume is given by the optimum baseline Mv-CoN, which indicates that the matching result is positive, with a generally accepted thresshold (i.e. 0.5). After browsing the post description and work experience that the Mv-CoN model mainly relies on, it is found that the matching degree between the post and the resume is very high. For example, in the post description, the recruiter requires the post seeker to be responsible for "daily operation". In the work experience, the job seeker show corresponding abilities and make himself a suitable candidate, that is, "responsible for the daily operation of the mall". In addition, other overlapping parts between the post description and the work experience, such as words "training", "assessment", "complaint" and "safety", also provide strong support for the Mv-CoN model to classify the post and the resume into a positive instance of the matching.

However, compared with the optimum baseline model, the matching degree between the post and the resume predicted by InEXIT according to this disclosure is 0.17, which is close to the true matching degree of 0 with the generally accepted threshold. Difference between Mv-CoN and InEXIT can be attributed to InEXIT's consideration of whole semi-structured multivariate attributes, not just free text attributes, that is, the post description and the work experience. In this case, the recruiter requires the minimum education level of the job seeker to be "Bachelor Degree" and can only offer a salary of 6,001 to 8,000. The job seekers requires an unsatisfied salary, that is, 10,001 to 15,000, and the educational level is unqualified, that is, "junior college". In view of the above observation, there's a high probability for InEXIT to classify the current post and resume into a negative instance of mismatching. Qualitative analysis of real cases shows that the InEXIT model according to this disclosure can make good use of semi-structured multivariate attributes to fully match the posts and resumes in online recruitment services.

It should be noted that the method of the embodiment of the present disclosure can be performed by a single device, such as a computer or a server. The method of this embodiment can also be applied to distributed scenarios, which is completed by cooperation of multiple devices. In this distributed scenario, one of the devices can only perform one or more of the steps in the method of the embodiment of the disclosure, and the devices can interact with each other to complete the method.

It should be noted that some embodiments of the present disclosure have been described above. Other embodiments are within the scope of the appended claims. In some cases, actions or steps recited in the claims may be performed in an different order from that in the above embodiments and still achieve the desired results. In addition, the processes depicted in the drawings do not necessarily require the specific or sequential order shown to achieve the desired results. In some embodiments, multitasking and parallel processing are also possible or may be advantageous.

On a basis of the same concept, corresponding to the method of any of the above embodiments, an apparatus for predicting the matching degree between a resume and a post is further provided in this disclosure.

Figure 7:
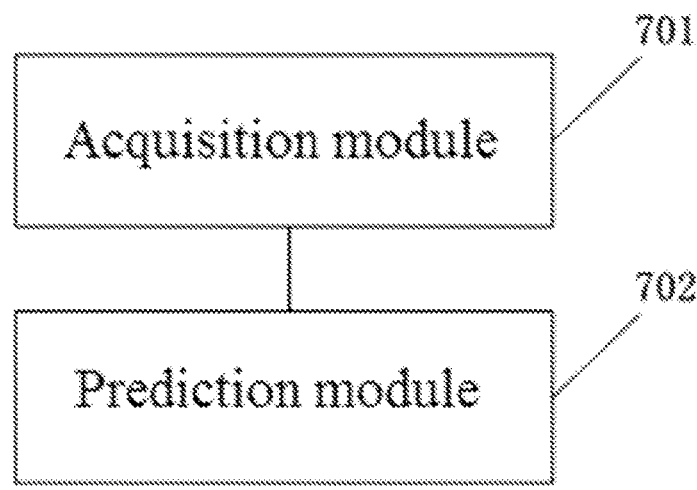
FIG. 7 is a schematic diagram of an apparatus for predicting matching degree between a resume and a post according to an embodiment of the present disclosure.

Referring to FIG. 7, the apparatus for predicting the matching degree between the resume and the post includes an acquisition module 701 and a prediction module 702.

The acquisition module 701 is configured to obtain a first key and a first value of a respective semi-structured post attribute in the post information and a second key and a second value of a respective semi-structured resume attribute in the resume information. The first key, the first value, the second key and the second value are all expressed in text data.

The prediction module 702 is configured to predict the matching degree between the resume information and the post information by a prediction model including a cascaded pre-trained language model, a Transformer encoder and a single label classification model, based on the first key and the first value of the respective post attribute, a first source representation corresponding to the post information, the second key and the second value of the respective resume attribute, and a second source representation corresponding to the resume information.

In other embodiments, predicting the matching degree between the resume information and the post information by the prediction module 702 specifically includes:

for the first key and the first value of the respective post attribute, respectively encoding the first key and the first value into a semantic space through the pre-trained language model so as to obtain a first key embedding and a first value embedding, and fusing the first key embedding and the first value embedding so as to obtain a first fused embedding of the post attribute;

encoding the first source representation into the semantic space through the pre-trained language model so as to obtain a first source embedding;

for the second key and the second value of the respective resume attribute, respectively encoding the second key and the second value into the semantic space through the pre-trained language model so as to obtain a second key embedding and a second value embedding, and fusing the second key embedding and the second value embedding so as to obtain a second fused embedding of the resume attribute;

encoding the second source representation into the semantic space through the pre-trained language model so as to obtain a second source embedding;

performing internal interaction of a first matrix including the first fusion embedding of the respective post attribute so as to obtain a first internal-interaction-attribute embedding matrix and performing internal interaction of a second matrix including the second fusion embedding of the respective resume attribute so as to obtain a second internal-interaction-attribute embedding matrix, with the Transformer encoder;

fusing each element in the first internal-interaction-attribute embedding matrix respectively with the first source embedding so as to obtain a first updated embedding matrix;

fusing each element in the second internal-interaction-attribute embedding matrix respectively with the second source embedding so as to obtain a second updated embedding matrix;

performing external interaction between the first updated embedding matrix and the second updated embedding matrix with the Transformer encoder so as to obtain a first external-interaction-attribute embedding matrix and a second external-interaction-attribute embedding matrix; and predicting the matching degree between the resume information and the post information through the single label classification model according to the first external-interaction-attribute embedding matrix and the second external-interaction-attribute embedding matrix.

Further, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all include an additive fusing operation.

Further, fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all include a concatenate fusing operation.

Further, performing the internal interaction of the first matrix so as to obtain the first internal-interaction-attribute embedding matrix includes: obtaining a first multi-head self-attention matrix using a multi-head self-attention mechanism in the Transformer encoder according to the first matrix; and obtaining the first internal-interaction-attribute embedding matrix according to the first multi-head self-attention matrix through a first fully connected feedforward layer in the Transformer encoder.

Performing the internal interaction of the second matrix so as to obtain the second internal-interaction-attribute embedding matrix includes: obtaining a second multi-head self-attention matrix using a multi-head self-attention mechanism in the Transformer encoder according to the second matrix; and obtaining the second internal-interaction-attribute embedding matrix according to the second multi-head self-attention matrix through a second fully connected feedforward layer in the Transformer encoder.

Further, performing the external interaction so as to obtain the first external-interaction-attribute embedding matrix and the second external-interaction-attribute embedding matrix includes:
concatenating the first updated embedding matrix and the second updated embedding matrix to obtain a joint matrix;
obtaining a multi-head self-attention joint matrix according to the joint matrix by using the multi-head self-attention mechanism in the Transformer encoder; and
obtaining the first external-interaction-attribute embedding matrix and the second external-interaction-attribute embedding matrix according to the multi-head self-attention joint matrix through a third fully connected feedforward layer in the Transformer encoder.

Further, predicting the matching degree according to the first external-interaction-attribute embedding matrix and the second external-interaction-attribute embedding matrix includes:
respectively pooling the first external-interaction-attribute embedding matrix and the second external-interaction-attribute embedding matrix through a first pooling layer and a second pooling layer in the single label classification model so as to obtain a post vector and a resume vector;
aggregating the post vector and the resume vector to obtain an aggregated vector;
performing semantic fusion on the aggregated vector through a multilayer perceptron in the single label classification model, and obtaining a matching score by using a single neuron according to the aggregated vector subjected to the semantic fusion; and
obtaining the matching degree of the resume information and the post information using an activation function according to the matching score.

Further, the pooling is performed by using an adaptive average pooling function provided by a machine learning framework PyTorch.

Further, the prediction model is trained by minimizing binary cross entropy loss.

For convenience of description, when the above devices are described, it is made for various modules in terms of functions. Of course, when this disclosure is implemented, the functions of each module can be implemented in one or more pieces of software and/or hardware.

The device in the above embodiments is used to implement the corresponding person-post matching method in any one of the above embodiments, and present beneficial effects of the corresponding method embodiments, which will not be described in detail here.

On a basis of the same concept, corresponding to the method of any of the above embodiments, an electronic device is also provided in this disclosure, which includes a memory, a processor and a computer program stored on the memory and operable on the processor, and the processor implements the method for predicting the matching degree between the resume and the post described in any one of the above embodiments when executing the program.

Figure 8:
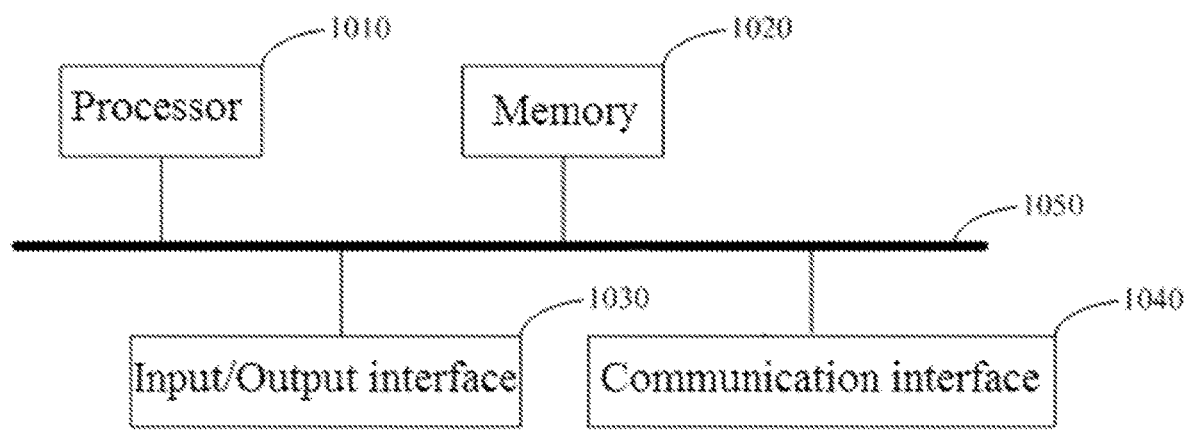
FIG. 8 is a schematic structural diagram of an electronic device according to an embodiment of the disclosure.

FIG. 8 shows a more specific hardware structure diagram of an electronic device provided in this embodiment, which may include a processor 1010, a memory 1020, an input/output interface 1030, a communication interface 1040 and a bus 1050. A communication connection with each other is realized among the processor 1010, the memory 1020, the input/output interface 1030 and the communication interface 1040 in the device through the bus 1050.

The processor 1010 can be implemented by a general-purpose CPU (Central Processing Unit), a microprocessor, an application specific integrated circuit (ASIC), or one or more integrated circuits, etc., and is used for executing relevant programs to realize technical schemes provided in the embodiments of this disclosure.

The memory 1020 can be implemented in a form of ROM (Read Only Memory), RAM(Random Access Memory), static storage device, dynamic storage device, or the like. The memory 1020 can store the operating system and other application programs. When the technical schemes provided in the embodiments of this disclosure is implemented by software or firmware, relevant program codes are stored in the memory 1020 and called and executed by the processor 1010.

The input/output interface 1030 is used to connect the input/output module to realize information input and output. The input/output module can be configured as a component in the device (not shown in the figure), or it can be externally connected to the device to provide corresponding functions. An input device can include a keyboard, a mouse, a touch screen, a microphone and various sensors, and an output device can include a display, a speaker, a vibrator and an indicator.

The communication interface 1040 is used to connect with a communication module (not shown in the figure) to realize communication interaction between the device and other devices. The communication module can communicate by wired means (such as USB, network cable, etc.) or by wireless means (such as mobile network, WIFI, Bluetooth, etc.).

The bus 1050 includes a path for transmitting information among various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in the specific implementation process, the device may also include other components necessary for normal operation. In addition, it can be understood by those skilled in the art that the above-mentioned device may only contain the components necessary for implementing the embodiments of this disclosure, and need not contain all the components shown in the drawings.

The electric device in the above embodiments is used to implement the corresponding person-post matching method in the above embodiments, and present beneficial effects of the corresponding method embodiments, which will not be described in detail here.

On a basis of the same concept, corresponding to the method of any of the above embodiments, a non-transient computer-readable storage medium is further provided in the disclosure, which stores computer instructions, and the computer instructions are configured to make the computer implement the method for predicting the matching degree between the resume and the post as described in any of the above embodiments.

The computer-readable media of this embodiment includes permanent or non-permanent, removable or non-removable media, and information storage can be realized by any method or technology. The information can be a computer-readable instruction, a data structure, a module of programs, or other data. Examples of the storage media of computers include, But not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic tape cartridge, magnetic tape, magnetic disk storage or other magnetic storage devices or any other non-transmission medium that can be used to store information that can be accessed by computing devices.

The computer instructions stored in the storage medium of the above embodiment are used to make the computer implement the person-post matching method as described in any embodiment, and present beneficial effects of the corresponding method embodiments, which will not be described in detail here.

It should be understood by those of ordinary skilled in the art that discussion of any of the above embodiments is only exemplary, and is not intended to imply that the scope of the disclosure (including the claims) is limited to these examples; under the idea of this disclosure, the technical features in the above embodiments or different embodiments can also be combined, and the steps can be realized in any order; and there are many other changes in different aspects of the embodiments of this disclosure as described above, which are not provided in details for brevity.

In addition, in order to simplify the description and discussion, and in order not to make the embodiments of the present disclosure difficult to understand, well-known power/ground connections with integrated circuit (IC) chips and other components may or may not be shown in the provided drawings. In addition, the devices can be shown in the form of block diagrams in order to avoid making the embodiments of the present disclosure difficult to understand, and this also takes into account the fact that the details about the implementation of these devices in block diagram are highly dependent on a platform on which the embodiments of the present disclosure will be implemented (i.e., these details should be completely within an understanding range of those skilled in the art). While specific details (e.g., circuits) have been set forth to describe exemplary embodiments of the present disclosure, it will be apparent to those skilled in the art that the embodiments of the present disclosure may be practiced without these specific details or with variations in these specific details. Therefore, these descriptions should be regarded as illustrative rather than restrictive.

Although the present disclosure has been described in conjunction with specific embodiments thereof, many alternatives, modifications and variations of these embodiments will be apparent to those of ordinary skill in the art based on the foregoing description. For example, the discussed embodiments can be applied in other memory architectures (such as dynamic RAM (DRAM)).

The embodiments of the present disclosure are intended to cover all such alternatives, modifications and variations that fall within the broad scope of the append claims. Therefore, any omissions, modifications, equivalent substitutions, improvements, etc. made within the spirit and principles of the embodiments of this disclosure shall be encompassed within the protection scope of this disclosure.

What is claimed is:

1. A method for predicting matching degree between resume information and post information, implemented via a processor, comprising:
receiving, via input interface, the resume information and the post information from storage;
obtaining, via a processor, a first key and a first value of a respective semi-structured post attribute in the post information and a second key and a second value of a respective semi-structured resume attribute in the resume information, the first key, the first value, the second key and the second value being all expressed in text data; and
predicting, via the processor, the matching degree between the resume information and the post information by a prediction model including a cascaded pre-trained language model, a Transformer encoder and a single label classification model, based on the first key and the first value of the respective post attribute, a first source representation corresponding to the post information, the second key and the second value of the respective resume attribute, and a second source representation corresponding to the resume information;
wherein predicting the matching degree between the resume information and the post information comprises:
for the first key and the first value of the respective post attribute, respectively encoding the first key and the first value into a semantic space through the pre-trained language model so as to obtain a first key embedding and a first value embedding, and fusing the first key embedding and the first value embedding so as to obtain a first fused embedding of the post attribute;
encoding the first source representation into the semantic space through the pre-trained language model so as to obtain a first source embedding;
for the second key and the second value of the respective resume attribute, respectively encoding the second key and the second value into the semantic space through the pre-trained language model so as to obtain a second key embedding and a second value embedding, and fusing the second key embedding and the second value embedding so as to obtain a second fused embedding of the resume attribute;
encoding, via the processor, the second source representation into the semantic space through the pre-trained language model so as to obtain a second source embedding; and
performing, via the processor, internal interaction of a first matrix including the first fusion embedding of the respective post attribute so as to obtain a first internal-interaction-attribute embedding matrix and performing internal interaction of a second matrix including the second fusion embedding of the respective resume attribute so as to obtain a second internal-interaction-attribute embedding matrix, with the Transformer encoder;
wherein the fusing and embedding operations are performed on all attributes in $\mathcal{J}$ and $\mathcal{R}$ to obtain matrix representations of $\mathcal{J}$ and $\mathcal{R}$:

$$X_J = [j_1^a; j_2^a; \ldots ; j_m^a],$$

$$X_R = [r_1^a; r_2^a; \ldots ; r_n^a],$$

where J is the post information, $\mathcal{R}$ is the resume information, $j_i^a$, $r_j^a \in \mathbb{R}^{d_{in}}$ are fused and embedded expressions of an i-th attribute in $\mathcal{J}$ and a j-th attribute in $\mathcal{R}$, respectively, $i \in \{1,2,\ldots,m\}$, $j \in \{1,2,\ldots,n\}$, $X_J \in \mathcal{R}^{m \times d_{in}}$ is a first matrix and the matrix representation of $\mathcal{J}$, $X_R \in \mathbb{R}^{n \times d_{in}}$ is a second matrix and the matrix representation of $\mathcal{J}$, m and n are corresponding numbers of attributes in $\mathcal{J}$ and $\mathcal{R}$, and $d_{in}$ is a vector dimension after an attribute value and an attribute key are fused;

wherein a multi-head self-attention matrix representation of $\mathcal{J}$, $M_J$, and a multi-head self-attention matrix representation of $\mathcal{R}$, $M_R$, are calculated according to:

$$M_J^h = \text{softmax}\left(\frac{(X_J \cdot Q_J^h)(X_J \cdot K_J^h)^T}{\sqrt{d_{in}}}\right) X_J \cdot V_J^h,$$

$$M_R^h = \text{softmax}\left(\frac{(X_R \cdot Q_R^h)(X_R \cdot K_R^h)^T}{\sqrt{d_{in}}}\right) X_R \cdot V_R^h,$$

$$M_J = \text{concat}(M_J^1, M_J^2, \ldots, M_J^H) \cdot O_J,$$

$$M_R = \text{concat}(M_R^1, M_R^2, \ldots, M_R^H) \cdot O_R,$$

where $Q_J^h$, $Q_R^h \in \mathbb{R}^{d_{in} \times d_q}$, $K_J^h$, $K_R^h \in \mathbb{R}^{d_{in} \times d_k}$, $V_J^h$, $V_R^h \in \mathbb{R}^{d_{in} \times d_{vk}}$ and $O_J$, $O_R \in \mathbb{R}^{H \cdot d_v \times d_{in}}$ are trainable network parameters; $h \in \{1, 2, \ldots, H\}$, H represents a number of headers of the Transformer encoder, $d_q = d_k = d_v = d_{in}/H$, $M_J^h$ and $M_R^h$ are self-attention matrix representations of $\mathcal{J}$ and $\mathcal{R}$ at an h-th head;

$M_J$ and $M_R$ are input into a feedforward layer of the Transformer encoder to obtain internal interaction representations of $\mathcal{J}$ and $\mathcal{R}$ as follows:

$$M_J = \text{feedforward}(M_J),$$

$$= [j_1^{a'}; j_2^{a'}; \ldots ; j_m^{a'}],$$

$$M_R = \text{feedforward}(M_R),$$

$$= [r_1^{a'}; r_2^{a'}; \ldots ; r_n^{a'}],$$

where $j_i^{a'}$, $r_j^{a'} \in \mathbb{R}^{d_{in}}$ are internal-interaction-attribute embeddings of the i-th attribute in $\mathcal{J}$ and the j-th attribute in $\mathcal{J}$, $i \in \{1, 2, \ldots, m\}$ and $j \in \{1, 2, \ldots, n\}$, respectively; and wherein the prediction model is trained by minimizing a binary cross entropy loss according to:

$$\mathcal{L} = -1/N \sum_{i=1}^{N} (\mathcal{Y}_i \log(\mathcal{Y}'_i) + (1 - \mathcal{Y}_i) \log(1 - \mathcal{Y}'_i)),$$

where $\mathcal{Y}_i$ is a true matching degree of an i-th training instance; $\mathcal{Y}'_i$ is a predicted matching degree of the i-th training instance generated by the model; N is a total number of training instances, thus predicting an accurate matching degree between the resume information and the post information to obtain rich representations of the resume information and the post information; and presenting, via output interface, rich representations of the resume information and the post information, which comprising the resume information, the post information and the accurate matching degree, wherein when the accurate matching degree is 1 indicates match, and when the accurate matching degree is 0 indicates no match.

2. The method according to claim 1, wherein predicting the matching degree between the resume information and the post information further comprises:

fusing each element in the first internal-interaction-attribute embedding matrix respectively with the first source embedding so as to obtain a first updated embedding matrix;

fusing each element in the second internal-interaction-attribute embedding matrix respectively with the second source embedding so as to obtain a second updated embedding matrix;

performing external interaction between the first updated embedding matrix and the second updated embedding matrix with the Transformer encoder so as to obtain a first external-interaction-attribute embedding matrix and a second external-interaction-attribute embedding matrix; and predicting the matching degree between the resume information and the post information through the single label classification model according to the first external-interaction-attribute embedding matrix and the second external-interaction-attribute embedding matrix.

3. The method according to claim 2, wherein fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all comprises an additive fusing operation.

4. The method according to claim 2, wherein fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all comprises a concatenate fusing operation.

5. The method according to claim 2, wherein performing the internal interaction of the first matrix so as to obtain the first internal-interaction-attribute embedding matrix comprises: obtaining a first multi-head self-attention matrix using a multi-head self-attention mechanism in the Transformer encoder according to the first matrix; and obtaining the first internal-interaction-attribute embedding matrix according to the first multi-head self-attention matrix through a first fully connected feedforward layer in the Transformer encoder; and performing the internal interaction of the second matrix so as to obtain the second internal-interaction-attribute embedding matrix comprises: obtaining a second multi-head self-attention matrix using a multi-head self-attention mechanism in the Transformer encoder according to the second matrix; and obtaining the second internal-interaction-attribute embedding matrix according to the second multi-head self-attention matrix through a second fully connected feedforward layer in the Transformer encoder.

6. The method according to claim 5, wherein performing the external interaction so as to obtain the first external-interaction-attribute embedding matrix and the second external-interaction-attribute embedding matrix comprises:

concatenating the first updated embedding matrix and the second updated embedding matrix to obtain a joint matrix;

obtaining a multi-head self-attention joint matrix according to the joint matrix by using the multi-head self-attention mechanism in the Transformer encoder; and obtaining the first external-interaction-attribute embedding matrix and the second external-interaction-attribute embedding matrix according to the multi-head self-attention joint matrix through a third fully connected feedforward layer in the Transformer encoder.

7. The method according to claim 2, wherein predicting the matching degree according to the first external-interaction-attribute embedding matrix and the second external-interaction-attribute embedding matrix comprises:
- respectively pooling the first external-interaction-attribute embedding matrix and the second external-interaction-attribute embedding matrix through a first pooling layer and a second pooling layer in the single label classification model so as to obtain a post vector and a resume vector;
- aggregating the post vector and the resume vector to obtain an aggregated vector;
- performing semantic fusion on the aggregated vector through a multilayer perceptron in the single label classification model, and obtaining a matching score by using a single neuron according to the aggregated vector subjected to the semantic fusion; and
- obtaining the matching degree of the resume information and the post information using an activation function according to the matching score.

8. The method according to claim 7, wherein the pooling is performed by using an adaptive average pooling function provided by a machine learning framework PyTorch.

9. An electronic device, comprising a memory, the processor and a computer program stored on the memory and executable on the processor, wherein the processor implements the method in claim 1 when executing the computer program.

10. The electronic device of claim 9, wherein predicting the matching degree between the resume information and the post information further comprises:
- fusing each element in the first internal-interaction-attribute embedding matrix respectively with the first source embedding so as to obtain a first updated embedding matrix;
- fusing each element in the second internal-interaction-attribute embedding matrix respectively with the second source embedding so as to obtain a second updated embedding matrix;
- performing external interaction between the first updated embedding matrix and the second updated embedding matrix with the Transformer encoder so as to obtain a first external-interaction-attribute embedding matrix and a second external-interaction-attribute embedding matrix; and
- predicting the matching degree between the resume information and the post information through the single label classification model according to the first external-interaction-attribute embedding matrix and the second external-interaction-attribute embedding matrix.

11. The electronic device of claim 10, wherein fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all comprises an additive fusing operation.

12. The electronic device of claim 10, wherein fusing the first key embedding and the first value embedding, fusing the second key embedding and the second value embedding, fusing each element in the first internal-interaction-attribute embedding matrix respectively with the first source embedding, and fusing each element in the second internal-interaction-attribute embedding matrix respectively with the second source embedding all comprises a concatenate fusing operation.

13. The electronic device of claim 10, wherein performing the internal interaction of the first matrix so as to obtain the first internal-interaction-attribute embedding matrix comprises: obtaining a first multi-head self-attention matrix using a multi-head self-attention mechanism in the Transformer encoder according to the first matrix; and obtaining the first internal-interaction-attribute embedding matrix according to the first multi-head self-attention matrix through a first fully connected feedforward layer in the Transformer encoder; and
- performing the internal interaction of the second matrix so as to obtain the second internal-interaction-attribute embedding matrix comprises: obtaining a second multi-head self-attention matrix using a multi-head self-attention mechanism in the Transformer encoder according to the second matrix; and obtaining the second internal-interaction-attribute embedding matrix according to the second multi-head self-attention matrix through a second fully connected feedforward layer in the Transformer encoder.

14. The electronic device of claim 13, wherein performing the external interaction so as to obtain the first external-interaction-attribute embedding matrix and the second external-interaction-attribute embedding matrix comprises:
- concatenating the first updated embedding matrix and the second updated embedding matrix to obtain a joint matrix;
- obtaining a multi-head self-attention joint matrix according to the joint matrix by using the multi-head self-attention mechanism in the Transformer encoder; and
- obtaining the first external-interaction-attribute embedding matrix and the second external-interaction-attribute embedding matrix according to the multi-head self-attention joint matrix through a third fully connected feedforward layer in the Transformer encoder.

15. The electronic device of claim 10, wherein predicting the matching degree according to the first external-interaction-attribute embedding matrix and the second external-interaction-attribute embedding matrix comprises:
- respectively pooling the first external-interaction-attribute embedding matrix and the second external-interaction-attribute embedding matrix through a first pooling layer and a second pooling layer in the single label classification model so as to obtain a post vector and a resume vector;
- aggregating the post vector and the resume vector to obtain an aggregated vector;
- performing semantic fusion on the aggregated vector through a multilayer perceptron in the single label classification model, and obtaining a matching score by using a single neuron according to the aggregated vector subjected to the semantic fusion; and
- obtaining the matching degree of the resume information and the post information using an activation function according to the matching score.

16. The electronic device of claim 15, wherein the pooling is performed by using an adaptive average pooling function provided by a machine learning framework PyTorch.

* * * * *